I. W. COLBURN.
SHEET GLASS DRAWING MECHANISM.
APPLICATION FILED OCT. 15, 1915.

1,274,385.

Patented Aug. 6, 1918.
3 SHEETS—SHEET 1.

Inventor
Irving W. Colburn

By Whittemore, Hulbert & Whittemore
Attorneys

I. W. COLBURN.
SHEET GLASS DRAWING MECHANISM.
APPLICATION FILED OCT. 15, 1915.

1,274,385.

Patented Aug. 6, 1918.
3 SHEETS—SHEET 2.

Inventor
Irving W. Colburn

By Whittemore Hulbert & Whittemore
Attorneys

I. W. COLBURN.
SHEET GLASS DRAWING MECHANISM.
APPLICATION FILED OCT. 15, 1915.

1,274,385.

Patented Aug. 6, 1918.
3 SHEETS—SHEET 3.

Inventor
Irving W. Colburn

By Whittemore, Hulbert & Whittemore
Attorneys

UNITED STATES PATENT OFFICE.

IRVING W. COLBURN, OF TOLEDO, OHIO, ASSIGNOR TO THE TOLEDO GLASS COMPANY, OF TOLEDO, OHIO, A CORPORATION OF OHIO.

SHEET-GLASS-DRAWING MECHANISM.

1,274,385.

Specification of Letters Patent.

Patented Aug. 6, 1918.

Application filed October 15, 1915. Serial No. 55,952.

*To all whom it may concern:*

Be it known that I, IRVING W. COLBURN, a citizen of the United States of America, residing at Toledo, in the county of Lucas and State of Ohio, have invented certain new and useful Improvements in Sheet-Glass-Drawing Mechanism, of which the following is a specification, reference being had therein to the accompanying drawings.

This invention relates to sheet glass drawing mechanism. In mechanisms of this class as heretofore constructed, great difficulty has been experienced in avoiding the marring of the fine fire finish of the sheet through contact with various parts of the mechanism, and particularly with the drawing table upon which the sheet rests during the drawing operation. As heretofore constructed, the table for supporting the drawn sheet, which sheet is hot and easily scratched or abraded, has been of the general character illustrated in U. S. Patent No. 876,267, granted on an application filed by Edgar Washburn and myself, said table being in the form of an endless apron composed of two parallel spaced sprocket-chains bearing transverse parallel bars, which bars constituted the surface of the table. These bars had transverse slots between them, and it has been found that the fine fire-finished surface of the drawn sheet was marred by the table at the points where these slots occurred, thus materially injuring the commercial value of the sheet.

One of the main objects of the present invention is to provide a table for receipt of the drawn sheet which shall not mar or injure the surface of the glass. With this object in view, the invention consists in the construction and combination of elements hereinafter described and then specifically pointed out in the claims.

One embodiment of the inventive idea is, for the purpose of illustration, shown in the accompanying drawings, in which—

Figure 1:
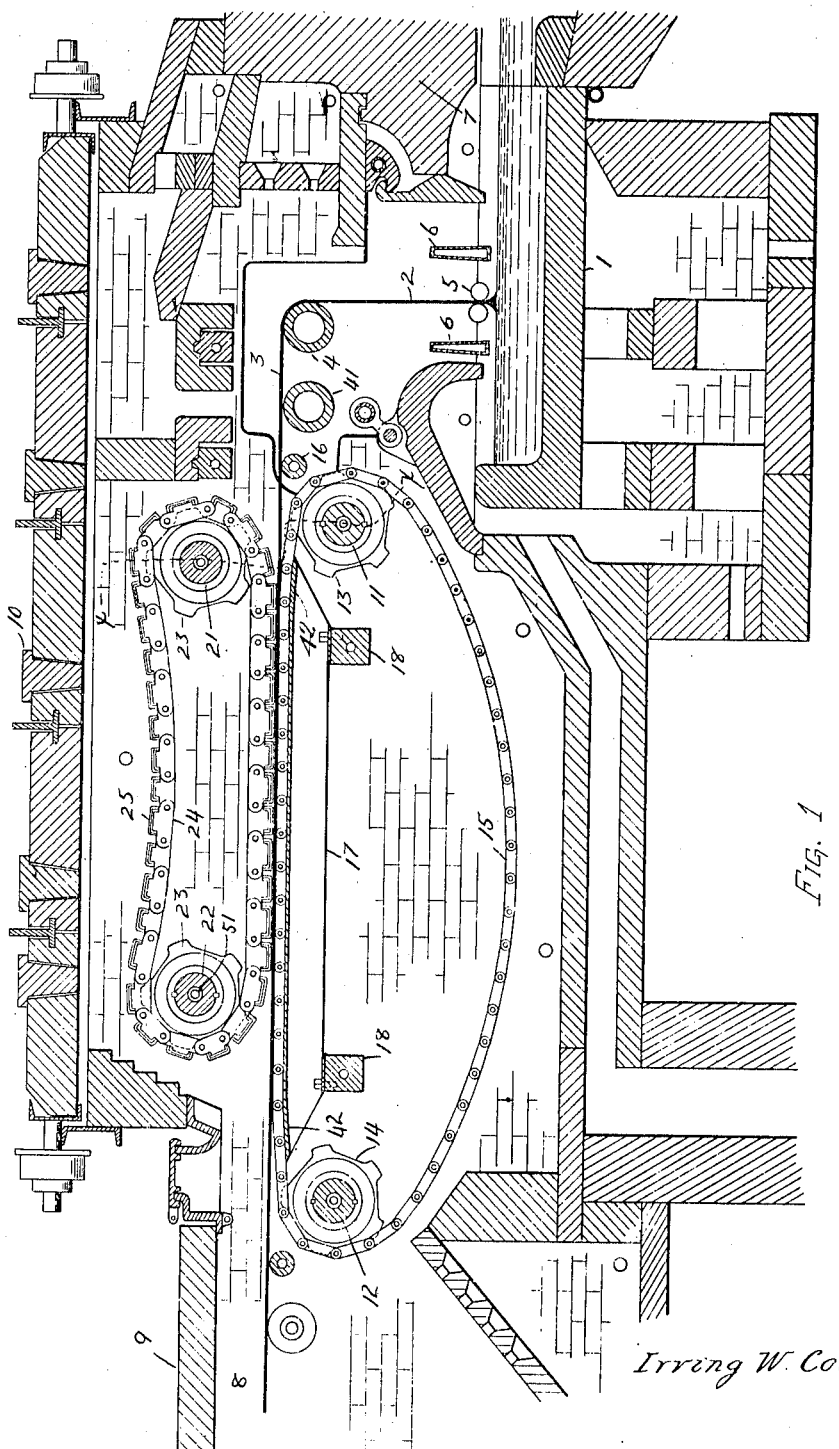
Figure 1 is a vertical central section through a sheet glass drawing apparatus, showing my improved drawing means, of which the drawing table forms a part.

Referring to the drawings, in which like reference numerals indicate corresponding parts throughout the several views, and referring first to Fig. 1, 1 indicates the tank for the molten glass, 2 the vertical portion of the glass sheet being drawn therefrom, and 3 the horizontal portion of said sheet after it has been bent over the bending roll 4. Width-maintaining devices 5 for gripping and holding the edges of the sheet are shown located near the surface of the molten glass in the tank 1, such devices preferably being of the character shown in my previous Patent 966,652. Means for cooling the sheet are indicated at 6, 6, which means are preferably in the form of chambers through which a cooling medium, as cold water, may be circulated. The drawing apparatus is inclosed by suitable brick-work 7 above the tank. After the sheet is drawn, it passes from the drawing chamber into a leer 8, provided with suitable walls 9 for inclosing the same. The top of the drawing chamber may be, and preferably is, provided with suitable removable blocks 10 of refractory material for allowing the escape of more or less of the heat, whereby the temperature of the drawing chamber may be regulated. The elements thus far enumerated may be of the usual or any suitable construction, and are herein shown for the purpose of illustrating the features now about to be described in their relation to said aforementioned elements.

Figure 9:
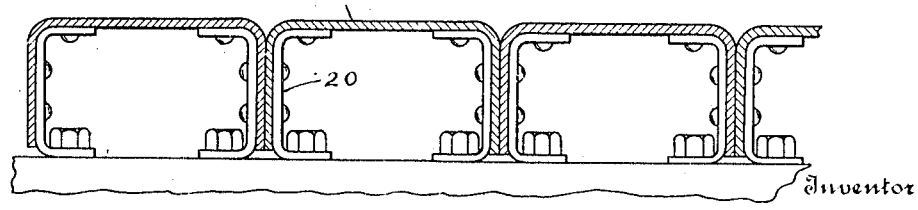
Fig. 9 is a vertical central section through the horizontal portion of the guide or stationary table for supporting the horizontal run of the drawing table.

Journaled in suitable bearings in the side walls of the structure are two transverse shafts 11 and 12, upon each of which is secured a pair of sprocket-wheels 13 and 14, over which passes the drawing table 15, in the form of an endless belt. It is essential that this drawing table in its horizontal run, where the glass sheet rests thereon, should present a smooth level surface, and in order to prevent the flexible belt constituting the table from yielding and presenting inequalities on its glass-receiving surface, the horizontal run of the belt or table 15 is supported by a stationary table 17, which not only supports, but acts as a guide for, the drawing table. As here shown, this horizontal stationary table is composed of a series of inverted channel bars 19 (Figs. 1 and 9) supported on transverse bars 18, and secured thereto by means of angle-plates 20, as will be readily understood from an inspection of Fig. 9.

Figure 2:
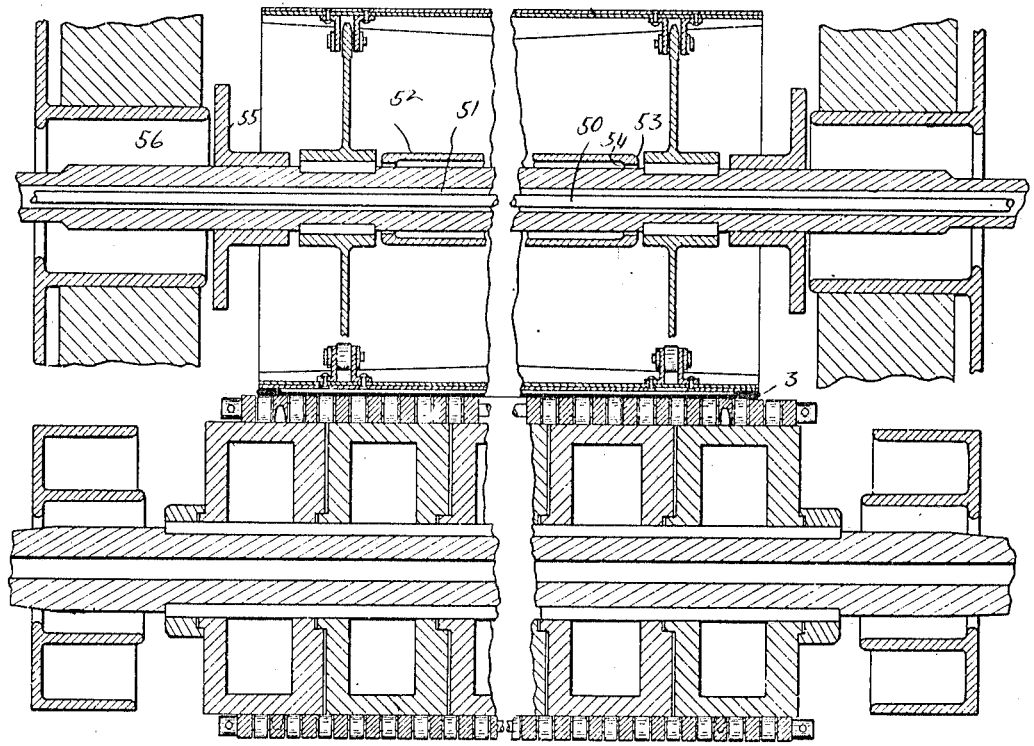
Fig. 2 is a section on the line x—x of Fig. 1.
Figure 3:
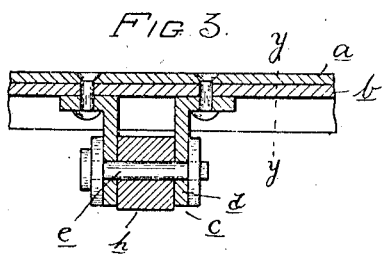
Fig. 3 is an enlarged longitudinal section through one of the gripper bars.
Figure 4:
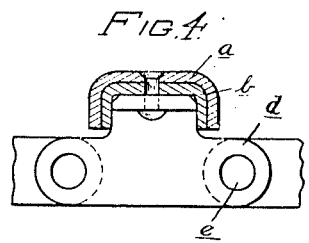
Fig. 4 is a vertical section on the line y—y of Fig. 3.

In the upper part of the drawing chamber, and in a plane above the horizontal run of the drawing table, are two transverse shafts 21 and 22, each having a pair of sprocket-wheels 23 thereon, and over these sprocket-wheels runs an endless apron 24, carrying gripping surfaces 25, which rest upon and grip the glass sheet 3, as shown in Fig. 2, during the drawing operation, and these, acting in conjunction with the drawing table, serve to continuously draw the glass in sheet form from the tank and over the bending roll. Preferably, the gripping surfaces 25 are in the form of gripping bars composed of U-shaped pieces of sheet metal $a$, $b$, nested one within the other and riveted with counter-sunk rivets, as shown in Fig. 4. Secured to the grip bars are lugs $c$ having lateral ears $d$ through which pass pins $e$ having spaces $h$ thereon, between which spaces the teeth of the sprocket-wheels 23 engage to drive the endless apron 24.

I have discovered that if the transverse slots heretofore existing between the bars constituting the drawing table are eliminated, and the table be composed of a transverse series of links whose ends overlap with the alternating links, whereby a continuous transverse slot or crevice is avoided, the surface of the glass is not affected and the glass thereof marred or rendered uneven, as in all the tables heretofore employed.

The inventive idea involved in the drawing table itself may receive a variety of mechanical expressions, some of which, for the purpose of illustration, are shown in Figs. 5, 6, 7 and 8.

Figure 5:
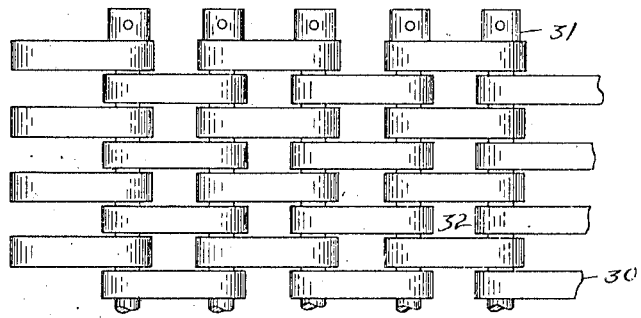
Fig. 5 is a plan view of a portion of the drawing table.

Referring more especially to Fig. 5, wherein I have illustrated the preferred form of endless drawing table, 31 indicates a series of parallel transverse rods, and pivoted on these rods are transverse series of longitudinally extending links 30, with the ends of the links of one series overlapping the ends of the links of the adjacent series and alternating therewith. By this construction, the presence of a continuous transverse slot or aperture is avoided, the only openings between the links being those shown at 32.

Figure 6:
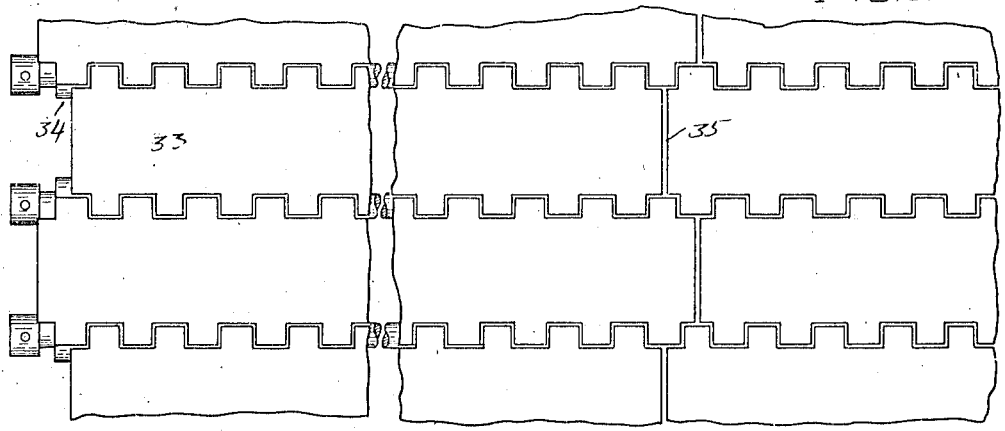
Figs. 6, 7 and 8 are similar plan views of another expression of the inventive idea, so far as the drawing table is concerned.

Referring to Fig. 6, there is shown another form of the invention, in which the links 33 are provided at their ends with toothed or notched edges 34, with the teeth at the end of one link intermeshing with and substantially filling the notches of the next adjacent tooth, the construction being such that there is no continuous straight line or opening across the table. Preferably, the links 33 are of such width that the slots 35 between the several links will be in staggered relation, as clearly shown in Fig. 6.

Figures 7, 8:
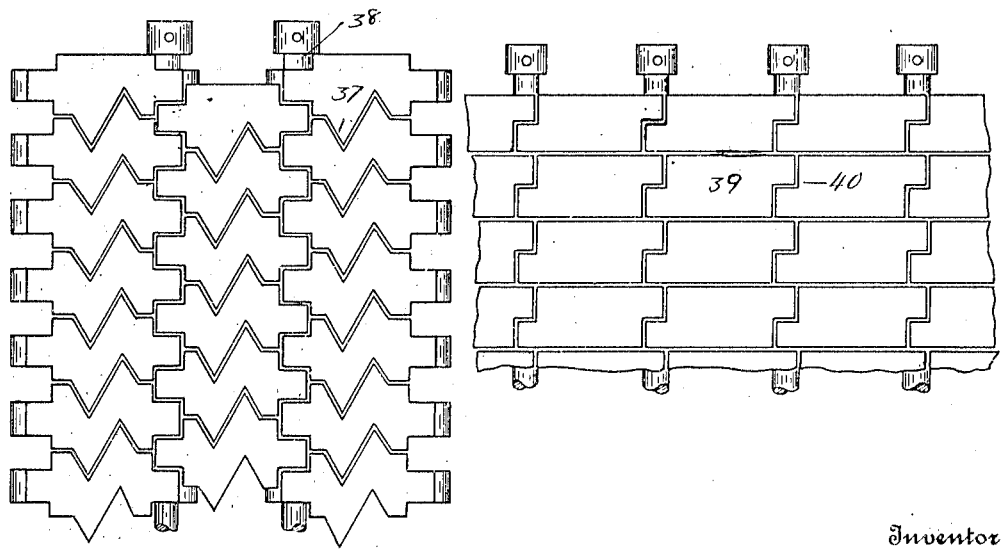

Referring to Fig. 7, there is disclosed a form of the invention in which the adjacent edges of the links, instead of being formed in straight lines, as shown in Figs. 5 and 6, are of a zig-zag or irregular shape, so as to produce irregular longitudinal slots, with the ends of the several links alternating and overlapping each other, but closely adjacent to each other.

In Fig. 8 is shown still another form in which the ends of the adjacent links overlap each other, and the edges of the several links are closely adjacent to each other.

Whether the table is composed of links of any one of the various forms disclosed, or other equivalent forms, the surfaces of the links are carefully and uniformly dressed, so that when the horizontal run of the drawing table 15 rests upon the stationary guide table 18, it will present a flat, smooth, substantially level upper surface for receiving the drawn sheet of glass.

Between the idler bending roll 4 and the drawing table 15 is preferably placed a second roll 41, which is preferably a driven roll, and I may, and preferably do, also employ a third roll 16, the tops of these rolls and the top of the horizontal run of the drawing table being preferably in the same horizontal plane, and the rolls 41 and 16 moving at the same surface speed as the drawing table.

As shown, when the drawing table leaves the sprocket-wheel 13, it is slightly below the surface of stationary table 17, upon which it is to rest and be supported, and by which it is to be guided, and for the purpose of receiving and supporting the inclined portion of the drawing table just before it reaches the main horizontal portion of the stationary table, the latter table is provided with an inclined portion 42, upon which inclined portion the drawing table rests and is supported, and by which it is gradually and uniformly brought up to the level, where it will receive and support the horizontal run of the drawn sheet 3. By this construction, the possibility of any injurious action of the drawing table upon the sheet is avoided. The other end of the table 17 may, and preferably is, provided with a similar, downwardly inclined portion 42, to correspondingly support the drawing table as it parts company with the sheet.

Preferably, the shafts 11, 12, 21 and 22 are hollow, and are provided with a pipe 50 for conducting water therethrough, and surrounding the pipe 50 is a return pipe 51. Cold water is preferably introduced through the pipe 50 and returns through the pipe 51 for the purpose of cooling the shafts. By preference, there is also provided around the shafts 21 and 22 a sleeve 52 having a slight inner annular flange 53 at its ends, with apertures 54 therethrough to act as additional means for preventing the overheating of the shafts. Upon each end of the shafts there is a flanged collar 55 for closing an aperture 56 through which the shaft projects to the outside, the driving means for the shaft being applied to said outwardly projecting end, and the collar 55 preventing the escape of heat from within the drawing chamber. I have also shown the rolls 4, 41 and 16 as hollow, so that a cooling fluid may, if desired, be passed therethrough. No particular driving mechanism is illustrated herein for the shafts 11, 12, 21 and 22, and the rolls 41 and 16, or the knurled rolls 5, as these may be of any desired construction, and their specific construction does not form any part of the present invention. Nor have I deemed it necessary to describe the heating means for supplying heat to the drawing chamber, since any suitable form of heating said chamber may be employed without affecting the present invention, which relates more particularly to the drawing mechanism.

What is claimed is:—

1. In a machine for drawing sheet glass, a source of molten glass and means for drawing glass therefrom in sheet form, said means comprising a stationary horizontal table or support and a drawing table consisting of an endless belt of longitudinally extending links arranged in transverse series with the links of each series alternating with and overlapping those of the adjacent series, with the overlapping portions in close juxtaposition to each other, and means for driving said drawing table with its horizontal run resting upon and supported by said stationary table.

2. In a machine for drawing sheet glass from a source of molten glass, the combination of a stationary table having a flat horizontally extending surface, with a driven endless drawing table composed of a plurality of series of longitudinally extending links with the links of one series in close juxtaposition to those of the adjoining series and with the pivotal portions of the links in adjacent series alternating, and means for driving said drawing table with its horizontal run resting upon and supported by said stationary table.

3. In a machine for drawing sheet glass from a source of molten glass, the combination of a stationary table having a flat horizontally extending surface throughout its main portion and a downwardly extending surface across one end, with a drawing table in the form of an endless belt composed of a plurality of series of longitudinally extending overlapping closely placed links, and means for driving said drawing table in supporting contact with said horizontal and inclined surfaces of the stationary table.

4. In a sheet glass drawing machine, the combination of an endless drawing table composed of alternating overlapping closely positioned links, with traveling means clamping the sheet upon said table, and a flat stationary table supporting said drawing table in its horizontal run.

5. In a sheet glass drawing machine, the combination of an endless drawing table comprising alternate overlapping closely positioned links, a flat stationary supporting surface on which the horizontal run of the drawing table travels and by which it is supported, said support also having a slightly inclined end upon which the drawing table travels and is supported, and traveling means clamping the sheet on said drawing table.

6. In a sheet glass drawing machine, the combination of an endless drawing table with a grip-bar device comprising an endless series of grip bars pivoted together, each bar being composed of a plurality of metal sections U-shaped in cross section and nested one within the other.

In testimony whereof I affix my signature in presence of two witnesses.

IRVING W. COLBURN.

Witnesses:
JOSEPH P. CROWLEY,
JAMES N. ANGUS.